Figure 1:
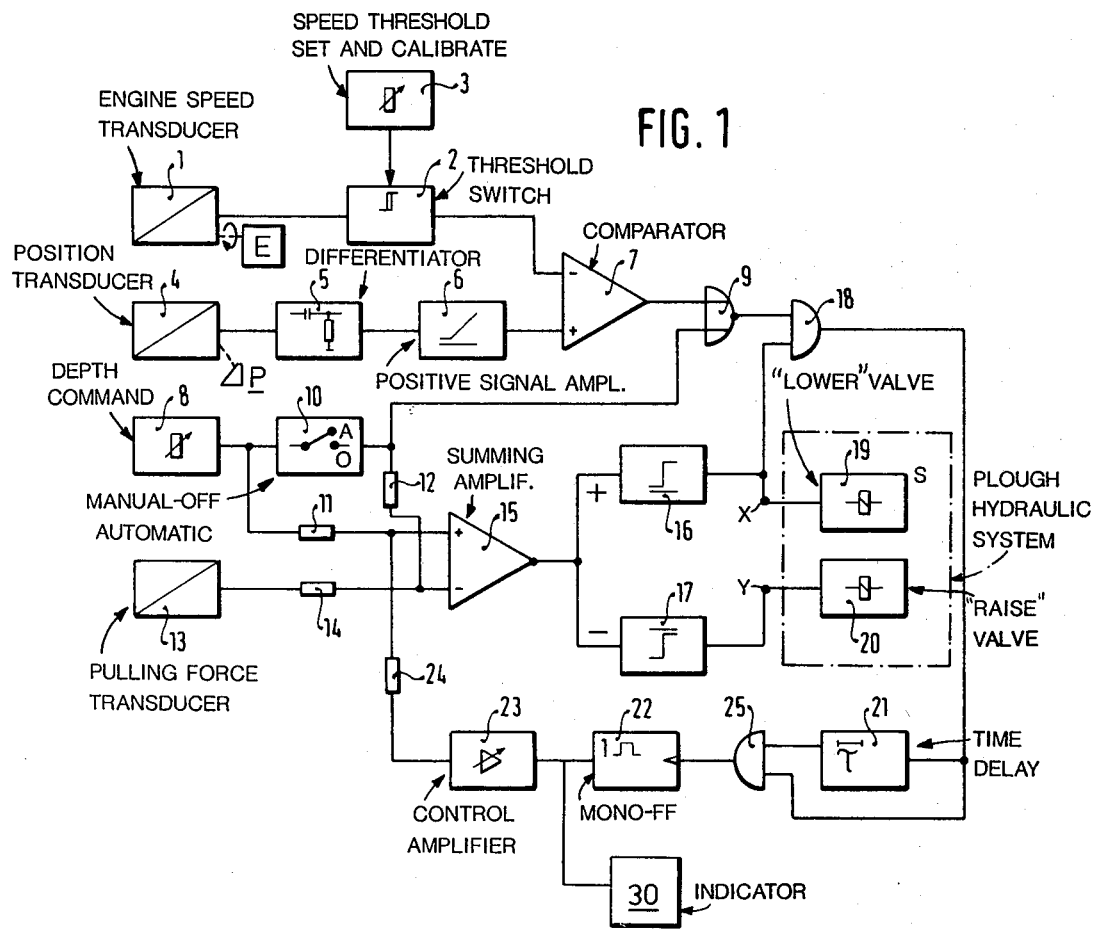

United States Patent [19]

Arnold et al.

[11] 4,454,919
[45] Jun. 19, 1984

[54] AGRICULTURAL TRACTOR-TRAILER SLIPPAGE RECOGNITION SYSTEM AND METHOD

[75] Inventors: Winfried Arnold, Vaihingen; Jan Vlemmings, Rutesheim, both of Fed. Rep. of Germany

[73] Assignee: Robert Bosch GmbH, Stuttgart, Fed. Rep. of Germany

[21] Appl. No.: 326,282

[22] Filed: Dec. 1, 1981

[30] Foreign Application Priority Data

Dec. 13, 1980 [DE] Fed. Rep. of Germany ....... 3047100

[51] Int. Cl.³ .................... A01B 63/112; A01B 79/00
[52] U.S. Cl. .......................................... 172/1; 172/3; 172/7; 172/430; 180/197; 364/433
[58] Field of Search ................... 172/1, 2, 3, 4, 4.5, 172/7, 9, 10, 11, 12, 430; 37/DIG. 1; 180/197; 364/432, 433

[56] References Cited

U.S. PATENT DOCUMENTS

| | | | |
|---|---|---|---|
| 3,819,004 | 6/1974 | Adde | 180/197 |
| 4,077,475 | 3/1978 | Hino et al. | 172/3 |
| 4,343,365 | 8/1982 | Rajogopal et al. | 172/4 |
| 4,344,499 | 8/1982 | Van der Lely et al. | 180/197 |

FOREIGN PATENT DOCUMENTS

2508620  8/1975  Fed. Rep. of Germany .......... 172/7

*Primary Examiner*—Richard T. Stouffer
*Attorney, Agent, or Firm*—Frishauf, Holtz, Goodman & Woodward

[57] ABSTRACT

To prevent a tractor pulling a plow (P) from digging itself in, if the plow position, with respect to soil or tractor level, is controlled by an automatic control system which causes the plow to be lowered if the pulling force of the tractor decreases, slip of the drive wheels of the tractor is sensed and an overriding command signal given to the plow positioning system (S) tending to raise the plow, or, alternatively, a visual indication is given to the operator that the plough should be raised manually; the slip condition is sensed by differentiating a signal representative of plow position, with respect to time, and comparing the so differentiated plow positioning signal (or, in other words, plow dropping speed signal) with a reference which, preferably, includes such factors as tractor engine speed, tractor and/or implement weight, ground wheel adhesion, tractor gearing, and the like.

24 Claims, 2 Drawing Figures

AGRICULTURAL TRACTOR-TRAILER SLIPPAGE RECOGNITION SYSTEM AND METHOD

The present invention relates to a system and a method to determine slippage of an agricultural tractor pulling an agricultural implement such as, for example, a plow, in which a position transducer is provided which furnishes an output signal representative of the position of the implement in or on the soil, to prevent binding of the instrument in the soil resulting in slippage of the tractor drive wheels.

BACKGROUND

Various types of control systems—usually hydraulic—of agricultural implements are known; for example, one such control system which determines the depth of a plow within the soil is described in the journal "Landtechnik" ("Agricultural Technology"), 1974, page 151. Plow control systems generally are provided to maintain the depth of bite of the plough in the soil at a predetermined level which depends on the pulling force supplied by the tractor which pulls the plow. The depth of position of the plow is controlled, as described, with reference to the position of the tractor. It is, of course, also possible to maintain a certain depth with respect to a sensed average soil level. If the soil consistency changes, for example from heavy soil to light soil, the automatic positioning system will control the plow to be dropped, since the pulling force has decreased. The situation may occur that the plow is dropped too far, so that the tractor is no longer capable to pull the plow. The wheels of the tractor will slip, and spin. Forward movement of the tractor is no longer possible upon spinning of the wheels. Consequently, the pulling force decreases. This, again, is sensed by the automatic control system and, in accordance with decreased pulling force, causes the plow to be placed at a still deeper position. The effect of this operation is that the plow will get stuck in the position since, upon spinning of the wheels, or slippage, the plow has the tendency to drop.

It has previously been proposed—see German Patent Disclosure Document DE-OS No. 24 29 594—to provide a load control system for wheeled vehicles which can recognize slippage or spinning of wheels and can provide suitable countervailing control measures. This arrangement has the disadvantage that it requires additional transducers with respect to the driven and the freely running wheels. These transducers not only are expensive but, further, are generally not suitable for use in agricultural equipment since the rough and generally contaminated conditions in agricultural equipment cause malfunction, and particularly erroneous output pulses. While it is possible to provide shields and the like to prevent contamination by dirt, such additional arrangements, again, are subject to contamination and soiling, require frequent cleaning, and generally are unsuited for practical agricultural use.

THE INVENTION

It is an object to provide a control system and method of control for an agricultural instrument such as a plow, which recognizes if slippage occurs or is about to occur, and provides suitable output signals to an operator or to a control system or to initate countervailing measures.

Briefly, a command signal source is provided which furnishes a reference signal representative of at least one reference parameter of the tractor, which, for example, is tractor engine speed and a general operating parameter related to tractor weight, types of tractor wheels, and the like—in general, related to the adhesive or driving force which the tractor is capable of exerting with respect to the underlying subsoil structure. This factor may, also, include characteristics of the pulled agricultural implement a plow, rake, or the like. A position signal transducer is provided which furnishes an output signal representative of the position of the implement with respect to a reference position, for example the position of the tractor. The reference signal is compared in a comparator with the first derivative, obtained by differentiating the position signal, that is, with a signal representative of change in position. If the change-in-position signal, that is, the differentiated positional signal, has a predetermined relationship with the reference signal indicative of slippage, an output signal is provided, indicating that the change of position of the implement is at a rate, with respect to the reference, which might cause the implement to dig itself in. Accordingly, a warning can be given to the operator and, in accordance with a feature of the invention, further, an automatically effective control signal can be generated acting either on the engine power control and/or on the hydraulic system controlling the level of the implement, for example the plowing depth, to slow the engine, and/or lift the plow.

The predetermined relationship, for example, is a differentiated output signal from the position transducer which is less than the reference signal, the reference signal itself including a factor related to the speed of the engine pulling the tractor.

The system has the advantage that the transducers required for its operation are usually already present on agricultural apparatus. Further additional position-or-operating transducers are not needed. The circuit requirement is low, and can be readily carried out, for example by discrete circuit components, or in integrated circuit form, and the system can be easily constructed as a separate electronic unit. Any erroneous controller operation which would lead to the plow digging itself in—in the absence of the system of the present invention—is readily recognized by the present system operating in accordance with the method, and corrective action can be initiated. The operating level at which corrective action is to be initiated can be changed manually by introducing a manual setting to form part, at least, of the reference level, and to calibrate the system as well.

DRAWINGS

Figure 2:
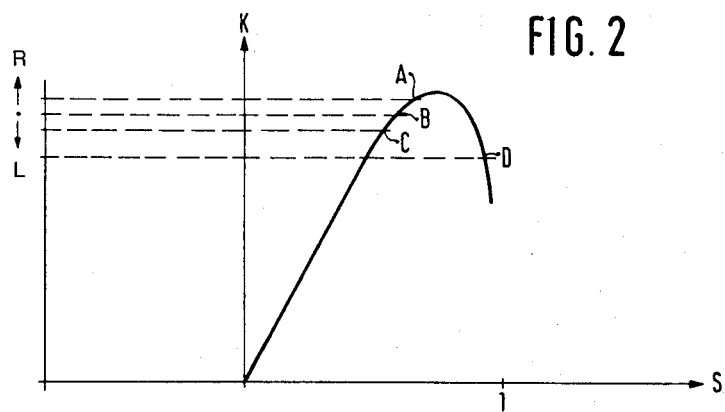

FIG. 1 is a schematic block diagram of the system in accordance with the present invention to determine slippage of drive wheels of an agricultural tractor (not shown); and FIG. 2 is a pulling force K (ordinate) vs. percentage slip S (abscissa) diagram of a typical agricultural tractor-implement combination.

An engine speed transducer 1—FIG. 1—is coupled to the engine E of the agricultural tractor (not shown), and provides an output signal representative of the speed of the engine E. The output signal is coupled to a threshold switch 2. The switching threshold of the threshold switch 2 can be changed by a speed threshold setting and calibrating input 3, for example a variable resistor, such as a potentiometer.

A position transducer 4 is provided, coupled to the agricultural implement shown schematically as a plow P. The output signal from transducer 4 is a signal representative of the position of the plow P with respect to the tractor (not shown). Such transducers are well known and standard on many agricultural tractor-implement combinations.

In accordance with a feature of the invention, the output position signal of the position transducer 4 is differentiated in a differentiator 5 connected thereto which, in its simplest form, is an R/C network. The output of the differentiator 5 is connected to a positive signal amplifier, that is, to an amplifier 6 which chops all negative signals derived from the differentiator and permits only positive signals to pass, that is, signals which indicate that the plow is changing its position in a dropping direction. The positive signal amplifier 6 thus amplifies only positive signals derived from the differentiator 5. Negative signals of the differentiator 5 are neither amplified nor passed by the amplifier 6. Amplification is, essentially, linear.

A comparator 7 is provided, for example formed by an operational amplifier. The inverting or negative input thereof is connected to the threshold switch 2, the positive input to the output of the positive signal amplifier 6. The output of the comparator 7 is connected through a NOR-gate 9 to one input of an AND-gate 18. The second input of the NOR-gate 9 is connected to a manual off and automatic change-over switch 10. A command signal source 8 provides a command signal for example by a potentiometer setting, from which the plowing depth of the plow P can be set. The command signal source 8 is connected through a manual-off and automatic change-over switch 10 and, further, through a resistor 11 with the positive input of an inverting summing amplifier or network 15. The output of the manual-off and automatic change-over switch is connected over a resistor 12 with the negative input of the summing circuit 15. Further, a connecting line from the switch 10 connects to the NOR-gate 9.

A pulling-force transducer 13, which measures the pulling force exerted by the implement coupled to the tractor, provides an electrical signal over a resistor 14 to the negative or inverting input of the summing circuit or adder 15 with inverting output. Such a pulling-force transducer may, for example, include a strain gauge connected to the coupling between tractor and pulled implement. The output of the summing circuit 15 is connected to two Schmitt triggers 16, 17. Schmitt trigger 16 switches over when the output of the summing circuit 15 provides a positive output signal. Schmitt trigger 17 responds to a negative signal at the output of the summing amplifier 15. The output of Schmitt trigger 16 is connected to a junction X which, in turn, is connected to a valve 19 which is part of a plow hydraulic system S and is a valve which causes the agricultural instrument, here the plow P, to drop. Valve 19, thus, is the "lower" valve which, when commanded to open, causes the plow to be lowered. Schmitt trigger 17 is connected through a junction Y to a "raise" valve 20 which, when energized, and hence open, causes the plow to raise. Valve 20 forms part of the hydraulic system S, and is, like valve 19, an electromagnetically controlled valve suitably arranged with respect to the pulled instrument, here plow P, to have the desired "lower" or "raise" action on the plow.

The output of Schmitt trigger 16 is additionally connected to a second input of the AND-gate 18, the other input of which is connected to the NOR-gate 9. The output of AND-gate 18 is connected through a time delay circuit 21 to one input of an AND-gate 25, the other input of which is connected directly from the AND-gate 18 to the AND-gate 25. The output of AND-gate 25 is connected to a monostable flip-flop (FF) which has a dynamic input, that is, is triggered by the rising flank of the output from gate 25. The output of the monostable flip-flop 22 is connected to a control amplifier 23 which, in turn, is connected through a resistor 24 to the positive or direct input of the summing circuit or amplifier 15. As can be seen, a closed loop control system is, therefore, provided, with an additional indicator of slip 30. The closed-loop system is not strictly necessary, but provides for automatic operation.

Operation, with reference to FIG. 2: The agricultural implement selected for the explanation is the plow P. In plowing, forward movement of the tractor causes a pulling force on the plow, which is determined by the shape of the plow, its weight, the speed of the tractor, wheel pressure of the drive wheels of the tractor, the shape and profile and pattern of the tractor wheels, their conditions, whether new or used, and the like. The pulling force is sensed by the pulling-force transducer 13. It is maintained at a constant level by a control loop which is shown in simplified manner, formed by the summing circuit 15, Schmitt triggers 16, 17, and valves 19, 20 of the raising and lowering hydraulic system of the plough. The pulling force itself is determined by the depth command 8. The entire automatic control system can be disconnected or disabled by the manual-off and automatic switch 10, permitting either automatic operation, or manual operation with opened valve 19, for example for operation of the tractor with rollers, or for traveling without plowing.

When the switch 10, provides a suitable logic signal indicative of non-plowing, free, or floating operation, the summing circuit will provide a negative output signal which, upon inversion, causes the Schmitt trigger 17 to be disabled, Schmitt trigger 16 to respond, and the "lower" valve 20 to cause the plow to be lowered to its minimum level. If the switch 10 is open, that is, in the A or automatic position. as shown in FIG. 1, the switch provides a logic 0-signal to the summing amplifier and the NOR-gate 9, and the control system is ready to operate.

To insure appropriate and desirable operation of the tractor, it is desirable to operate the tractor as close to the slippage or wheel spin limit as possible. Under such conditions, the rear wheels are highly loaded, plowing depth is an optimum, and operating speed high. The speed, of course, can be determined by controlling an engine throttle, and the plowing depth by the depth command transducer or source 8. FIG. 2 illustrates such a desirable and appropriate operating condition at point B. If the soil becomes heavier, the working point of the tractor, due to the higher pulling force required, will shift in the direction of point A. Consequently, the signal at the output of the pulling force transducer 13 will decrease, so that the output of the summing network 15 will change over to become negative which, over Schmitt trigger 17, activates the "raise" valve 20, causing the plow to be raised somewhat, and a shift of the working point back to point B. This mode of operation is illustrated at the left side of the diagram of FIG. 2, and shown schematically by the arrow R ("raise"). If the soil should become lighter, the force on transducer 13 increases, and the working point, set by the depth command 8, shifts in the direction of point C. Consequently, the pulling force transducer provides a higher output signal, resulting in positive output on the summing circuit 15, causing the "lower" valve 19 to open. The plow drops until the working point B again is reached. This mode of operation is shown at the left side of the diagram of FIG. 2 at L ("lower").

Sudden increase in pulling force may cause the slip-force curve to be exceeded. Under such conditions, the drive wheels of the tractor, suddenly, will not have sufficient ground adhesion and can no longer exert any pulling force. Consequently, the forward pulling force becomes small, and the pulling force which is sensed by the transducers 13 drops rapidly. This working condition is shown, for example, at point D. A small pulling force would, however, normally mean that a high output signal is derived from the transducer 13, resulting in a positive output at the summing amplifier 15 and hence energization of Schmitt trigger 16. The control system—absent the supervisory system of the present invention—would tend to compensate the low pulling force by opening of the "lower" valve 19, causing a drop of the plow P, as shown at the left side of FIG. 2. This, however, causes the plow to dig itself in, and the tractor no longer can free itself from the slippage region. The controller, thus, reacts erroneously with a "lower" command; positive feedback results rather than the desired "raise" command which would be due to negative feedback. The speed of the tractor will further go towards zero, it gets stuck, and the rotating drive wheels, now spinning at a higher speed, will cause the tractor to dig itself further in, unless a "raise" command can be obtained to raise the plow and permit tractor and plow to continue to travel.

The present invention is provided to overcome this positive feedback effect if the peak of the force-slip curve has been exceeded. The system and method of the present invention is based on the realization that the plow requires forward movement in order to be dropped or lowered, based on its weight, and static and dynamic parameters of the tractor, as well as on its pulling force. If, then, the forward speed becomes too slow, the dropping speed will also become slow. The dropping speed, however, is just that speed which can be derived by differentiating the position of the plow which can readily be determined by the position transducer 4, usually present on agricultural instruments of the automatic type anyway. The change of position or differential of the position is determined by the differentiator 5. Thus, by differentiating the position signal derived from transducer 4, it can be determined if erroneous operation is present which will lead to the tractor getting stuck. Only the dropping speed is of interest in this evaluation, and thus the positive signal amplifier 6 is provided which suppresses any signals from the differentiator which would indicate the speed of raising of the plow. Thus, only the positive signal, representative of speed of lowering the plow, is obtained and linearly amplified by the positive signal amplifier 6. This signal is applied to the comparator 7 and therein compared with the reference signal. Engine and slipping wheel speed are high.

The reference signal can be adjusted by hand but, preferably, it is derived as a composite dependent on the speed of the engine of the tractor, modified by a constant factor, set in for example by the threshold set and calibrating potentiometer 3, in dependence on the weight of the plow, since the pulling force, as well as the action of the tractor in digging itself in, depends on the shape of the plow, its weight, and the operating speed of the tractor.

If the differentiated signal at the positive input of comparator 7 is too small, that is, if the reference value at the minus input is not reached, slippage is indicated when Schmitt trigger 16 and "lower" valve 19 is activated. The output of the comparator 7 will then have an 0-signal thereat, which means that the control system must be so influenced that the plow is raised.

A logic circuit is provided, including the NOR-gate 9 and the AND-gate 18 which checks if further values are provided which definitely exclude erroneous response. Although the comparator 7 may have a 0-signal at its output, no influence will be placed thereby on the control system if the manual-off and automatic switch 10 has been operated, that is, if the plow is in a position under manual control. The switch 10, as noted provides a logic 1-signal under those conditions, so that the NOR-gate 9 is blocked at its output. A further interrogation point is the output of the Schmitt trigger 16, controlling the "lower" valve 19. Interference in the control system should be done only if a "lower valve" command is present. No interference in the system should occur if the system itself already has recognized that the working point A has been reached and that the plow should be raised but, due to the delay and inertia of the hydraulic system, no lifing has as yet occurred, but, rather, only a slow dropping was still in progress.

If these conditions, however, are not met, that is, if the comparator 7 has a zero-output signal, the manual-off and automatic switch 10 is in the "automatic" or A position, so that, again, a 0-signal is provided thereby and a "drop" signal is present from the output of the summing network 15, indicating that the "lower" valve is to be opened, then the AND-gate 18 will have two 1-signals thereon providing a logic 1-signal at its output. This logic 1-signal is connected through the time delay 21 to the AND-gate 25 and then to the monostable FF 22. The time delay element 21 is desirable in order to compensate for delayed reaction in the hydraulic system, so that the entire system will not be subjected to uncontrolled gyrations or oscillations, and to suppress short-time interferences, for example due to sudden movement of the tractor and the like, and to prevent erroneous operation due to short-time signals. The mono-FF 22 is SET by the rising flank of the delayed output from the AND-gate 25. The time of the mono-FF 22 is set to be comparatively short, so that, shortly after having been set in its unstable state, it reverts to quiescent state. This signal is applied over amplifier 23 and resistor 24 to the positive input of summing circuit 15. The level of the signal, and thus its effect, can be set by setting the amplification of the amplifier 23 and suitable selection of the resistors 24 in relation to the resistors 11 and 12. The output of the FF 22 provides a signal which is indicative of slip or incipient slip, which can be displayed on an indicator 30 to permit an operator to take corrective action.

The short-time positive signal from the mono-FF 22 and the amplifier 23 supplies a higher voltage, for this short time, to the positive input terminal of the summing circuit 15, which means a negative signal at its output, causing the Schmitt trigger 17 to respond so that junction Y will be energized and the "raise" valve 20 will opened so that the plow P will be raised or lifted. This will switch the working point of the tractor from D in the direction of the position A. Depending on the length of the pulse of the mono-FF 22, the working point A will be reached immediately, or in steps. As soon as the working point A is reached, the comparator 7 will switch over to provide a logic 1, so that the interference with the automatic control system, based on recognition of slip, no longer will be effective. If the working point is not yet reached, the Schmitt trigger 17 will not receive a signal at the end of the pulse from the mono-FF 22 and valve 20 will then close. Under the foregoing assumption, however, Schmitt trigger 16 will then switch through, and the "lower" valve 19 will open erroneously. Yet, the output of the AND-gate 18 will then provide again a 1-signal which was previously inhibited by blocking of the Schmitt trigger 16, causing, as above described, resetting of the mono-FF 22. These cycles will repeat until at least the point A has been reached.

The plow hydraulic system S will, therefore, raise the plow, in steps, until at least the working point A is reached. The comparator 7 determines if slippage continues.

For reliability of operation, however, additional parameters such as: switch 10 in automatic position? Schmitt trigger 16 energized? —are utilized to supervise the control system and its operation.

Substantial decrease in speed of the tractor or complete stoppage thereof can readily be determined by analyzing operation of the hydraulic lifting system. By determining the derivative of position with respect to time, erroneous operation of the control system in the control loop can be recognized, and a "raise" command can be initiated which prevents the tractor from digging itself in. The switching point can be preselected by setting of the speed threshold and calibration potentiometer 3 and/or can be changed in dependence on engine speed as derived from engine speed transducer 1.

The logic network including the NOR-gate 9 and AND-gate 18 can readily be matched to various requirements of different types of tractors and can be differently constructed, for example if the manual-off and automatic switch 10 should not be present, or if the signals are differently defined, that is, if the system operates with signals at different levels. The switching system can also be so constructed that, for example, a combined position-pulling force control can be obtained by connecting the respective signals to a mixer, in which the pulling force signal from the transducer 13 and the position signal of the position transducer 4 are, respectively, weighted, and applied to the summing network 15 by a suitable weighting and combining circuit.

Comparator 7, generally, determines under certain conditions slip in tractor vehicles with a trailed apparatus connected thereto or built thereon, in which slippage is either indicated, by indicator 30, and/or is applied directly to a control system. The system, as described, interferes with the level control of the plow itself; it need not be present, however, if the indicator 30 provides an output permitting the operator to manually operate the "raise" valve when slip is indicated.

The output signal derived from the comparator 7, as described, need not only be applied to the plow positioning hydraulic system S but, also, can be used to control the pulling force of the tractor. Thus, the operating condition of the overall tractor-plow combination, which may be a single unit or a dual unit, can be directly influenced in dependence on slip, automatically, without intervention by the operator. In many installations it is also desirable to provide an output indication to the operator, such as by indicator 30 which may be a warning lamp or the like. The operator, then, can take manual overriding corrective measures or, if no automatic control system is used, the operator is alerted to take manual corrective action by raising the plow.

The system is so arranged that it interferes with automatic operation only if the plow or other implement is to be lowered. This insures that the monitoring or slip control system will cause overriding action to be exerted only if the control system should go into a positive feedback mode, that is, if the peak A (FIG. 2) is exceeded and improper operation will result. The activation of the supervisory control loop is thus inhibited, unless slip has been recognized, to thereby prevent possible erroneous positioning due to stray pulses or other interferences in the electrical system.

Operating the system in the "automatic" mode permits essentially automatic overall control of the vehicle without interference in the automatic level or positioning control system of the vehicle, that is, the tractor, and the implement coupled thereto, or forming part thereof. Upon free running or free operation, the slip detection system is disabled.

The basic reference signal is, preferably, a composite formed by speed threshold setting and calibration, taking into consideration vehicle weight, weight of the plow, or other implement, tractor driving wheel ground adhesion, and, also, for example gearing of the tractor if the tractor is equipped with a multiple-speed gear-box. In addition, the reference signal is preferably based on the speed of the engine driving the tractor. Additional manual setting can be provided, based on experience of the operator with respect to slip, for example experience based on soil conditions, whether the soil is dry or wet, or whether the tractor is operating while it is raining or shortly thereafter; yet, permitting the operator to override the automatic system, or to set the threshold high by manual adjustment of the speed threshold potentiometer 3, also makes possible erroneous or deliberately wrong operation. Preferably, the reference signal is coupled to data which can be set into the potentiometer 3 by introducing voltage levels based, for example, on voltage dividers within the element 3 and specific to the vehicle. If the reference signal is generated solely based on vehicle characteristic data, operator errors are excluded. Delaying the command to raise the plow for a short period of time by the time delay element 21 additionally prevents malfunction or oscillatory operation due to the delay in the hydraulic system and the reaction of the control system, unless a slip signal has been detected and persists for a time in excess of the time delay of unit 21.

The system uses, essentially, only sensors which are usually already present, namely a sensor which senses the position of the implement, for example with respect to the tractor, or with respect to any other reference level; this signal, then differentiated, is compared in comparator 7, the output being applied to the warning lamp indicator 30 or, respectively, through the signal processing network 9, 18, 21, 25, 22, 23, 24 to cause the "raise" valve to be raised. The logic network formed by the gates 9, 18 and by the respective response of the summing amplifier 15 inhibits erroneous operation, so that the "raise" valve 20 can be enabled only if the manual-off and automatic switch 10 is in the automatic mode and, further, if, previously, the valve 19 has been activated, causing the implement to be lowered. This insures that the control circuit is invaded by an extraneous signal only if the control circuit cannot, itself, prevent the tractor—implement combination from digging itself in, that is, only if the already maximum permissible working force and working point—point A in FIG. 2—has been exceeded.

The engine speed signal derived by the transducer 1 can readily be obtained by any type of well known engine speed transducers. Most agricultural engines use either external ignition, Otto-type engines, or Diesel engines; if an ignition distributor is used, ignition pulses can be sensed and the sequence of the ignition pulses analyzed in a digital network, for example in a counter operating with respect to a timing reference, or connected to a digital-analog converter, to provide an output signal representative of engine speed, either in digital or analog, for example varying voltage form. Since tractors customarily also have alternators connected thereto, the frequency of operation of the alternator, likewise, can be analyzed to obtain a signal representative of tractor engine speed. Other signals can be obtained from instrumentation customarily available in various types of internal combustion engines, for example sensors providing an output signal when the piston of a selected one of the cylinders, or all of the cylinders reaches the top dead center (TDC) position. Further transducers, thus, providing output signals representative of engine speed need not be used, so that already existing transducers for the position of the plow or for the pulling force are entirely sufficient, it only being necessary to analyze a signal representative of engine speed, and derive a corresponding engine speed signal for application to the threshold switch 2.

The time delay unit 21 should have a time delay which is matched to the response characteristics of the hydraulic system of the specific tractor, since the control loop response time must be matched to that of the slow hydraulic response, rather than to the fast signal generation of the electrical system, as well known in closed-loop control theory. Interference in the control amplifier loop preferably is by connecting the control signal, as described, to the summing amplifier 15 of the control loop which controls the position of the plow or other implement, coupled to or forming part of the tractor. This results in simple circuitry, with connection in proper polarity at the very point where the command signals and pulling force transducer signals are being applied, and at low signal levels.

We claim:

1. Method to determine slip of driving wheels of a tractor pulling an agricultural implement (P) in which a position transducer (4) is provided coupled to the implement (P) and providing a position signal representative of the position of the implement with respect to a reference level, comprising the steps of providing a reference signal representative of at least one reference parameter;

differentiating the position signal derived from the position transducer;

comparing the differentiated position signal and the reference signal, and deriving an output signal when the differentiated position signal has a predetermined relationship with respect to the reference signal, indicative of change of position of the implement at a rate different from that defined by said predetermined relationship.

2. Method according to claim 1, wherein said relationship is a value of the differentiated position signal less than the reference signal, indicating change of position of the implement at a rate below that determined by the reference signal.

3. Method according to claim 1, including the step of deriving an engine speed signal representative of the speed of the engine driving the tractor;

and wherein said engine speed signal comprises at least a portion of said reference signal, engine speed forming one of the parameters represented by the reference signal.

4. Method according to claim 1, further including the step of deriving a vehicle characteristic signal representative of at least one of: weight of the tractor; weight of the implement; tractor driving wheel ground adhesion; tractor gearing;

and wherein said vehicle characteristic signal forms at least a portion of the reference signal, said vehicle characteristic signal defining one of the parameters represented by the reference signal.

5. Method according to claim 4, including the step of deriving an engine speed signal representative of the speed of the engine driving the tractor;

wherein said engine speed signal comprises at least a portion of said reference signal, engine speed forming one of the parameters represented by the reference signal;

and including the step of combining the engine speed signal and the vehicle characteristic signal to form the reference signal.

6. Method according to claim 1, further comprising the step of generating a depth command signal controlling the depth of the implement with respect to the reference level at a predetermined soil consistency requiring a predetermined implement pulling force;

and generating a control signal maintaining the pulling force with regard to said reference level essentially constant.

7. Method according to claim 6, including an implement positioning system (S) capable of raising or lowering the implement;

and including the step of applying said output signal to the positioning system when the positioning system is operative to lower the implement.

8. Method according to claim 7, wherein the output signal controls said positioning system tending to raise the implement.

9. Method according to claim 8, further including the step of generating a "manual-off" control signal to provide for manual operation;

and including the step of inhibiting interaction between said output signal and said control signal if a "manual-off" switch is in the "manual-off" position.

10. Method according to claim 8, further including the step of sensing the time duration of persistence of the output signal, and applying said output signal to the implement positioning system only if said output signal persists for a predetermined time period.

11. Agricultural soil working control apparatus having an implement (P) adapted to dig into and work the soil;

a tractor having an engine (E) pulling the implement;

a position transducer (4) coupled to the soil working implement (P) and providing a position output signal representative of the position of the implement with respect to a reference level;

an implement positioning system (S) including a "raise" control element (20) and a "lower" control element (19) to respectively raise or lower the position of said implement with respect to the reference level;

and comprising, in accordance with the invention, a reference signal source (1, 3, 2) providing a reference signal representative of at least one reference parameter;

a differentiator (5) connected to and controlled by the position output signal from the position transducer and providing a differentiated position signal;

a comparator (7) comparing the reference signal and the differentiated position signal, and providing an output signal if the differentiated position signal has a predetermined relationship with respect to the reference signal indicative of change of position of the implement at a rate different from that of said predetermined relationship;

and signal processing means (30; 9, 18) responsive to said output signal.

12. Apparatus according to claim 11, wherein said comparator (7) provides said output signal if the differentiated position signal is less than said reference signal, whereby said predetermined relationship is a "less than" condition.

13. Apparatus according to claim 11, further including engine speed transducer means (1) coupled to the engine (E) of the tractor and providing an engine speed output signal, said engine speed output signal forming at least part of said reference signal.

14. Apparatus according to claim 11, further including a reference signal command setting and calibrating element (3) providing a reference signal representative of at least one of:
weight of the tractor;
weight of the implement;
tractor driving ground wheel adhesion;
tractor gearing.

15. Apparatus according to claim 14, further including engine speed transducer means (1) coupled to the engine (E) of the tractor and providing an engine speed output signal, said engine speed output signal forming at least part of said reference signal;

and combining means (2) combining the engine speed signal and said settable reference signal to form a composite reference signal, said composite reference signal being connected to and controlling the comparator (7).

16. Apparatus according to claim 11, wherein said signal processing means comprises an indicator (30).

17. Apparatus according to claim 11, wherein said signal processing means comprises circuit means controlling said "raise" controlled element (20) to raise the element when said predetermined relationship is not met.

18. Apparatus according to claim 17, further including logic circuit means (9, 18) forming part of said signal processing means and applying said output signal to the implement positioning system only if the "lower" control element is activated.

19. Apparatus according to claim 17, further including a time delay element (21) forming part of said signal processing means and sensing persistence of said output signal for a predetermined time period, and connecting said output signal to the implement positioning system only if said time period is exceeded, to prevent application of said output signal based on short-time occurrences thereof.

20. Apparatus according to claim 17, further including chopper means (22) forming part of said signal processing means and being connected in circuit to apply said output signal to the signal processing system in the form of interrupted pulses.

21. Apparatus according to claim 17, further including a depth command source (8) providing a manually settable command signal determining the depth of said implement with respect to the reference level;

a pulling force transducer (13) providing a pulling force signal representative of the pulling force exerted by the tractor as the implement is pulled with respect to the soil;

circuit combining means (15) receiving the depth control signal and the pulling force signal, and providing output control signals to the positioning system to, respectively, control the "raise" control element (20) and the "lower" control element (19) to raise or lower the position of the implement with respect to said reference level in dependence on commanded depth and pulling force;

and wherein said output signal is coupled to said signal combining means to control said signal combining means to activate the "raise" control element if said predetermined relationship is not met.

22. Apparatus according to claim 21, wherein said signal combining means comprises a summing circuit (15), and said output signal is applied to said summing circuit.

23. Apparatus according to claim 21, further including a manual-off and automatic change-over switch (10) connected to said signal combining means, and permitting application of said output signal to the implement positioning system only if the system is in "automatic" mode.

24. Apparatus according to claim 11, wherein the engine (E) of the tractor has an engine control system (EC) operative to increase or decrease engine power;

and said output signal is connected to control the engine control system in a direction tending to decrease engine power, unless said predetermined relationship is met.

* * * * *